United States Patent [19]
Goddard

[11] 4,289,291
[45] Sep. 15, 1981

[54] RETRACTABLE STORAGE LUG

[75] Inventor: Donald L. Goddard, Lynchburg, Va.

[73] Assignee: The Babcock & Wilcox Company, New Orleans, La.

[21] Appl. No.: 970,776

[22] Filed: Dec. 18, 1978

[51] Int. Cl.² ............................................. A47F 5/00
[52] U.S. Cl. .................................... 248/293; 176/76; 176/87
[58] Field of Search ............... 248/293, 304, 306, 308, 248/671; 176/76, 87; 52/573; 110/336

[56] References Cited

U.S. PATENT DOCUMENTS

| | | | |
|---|---|---|---|
| 2,471,776 | 5/1949 | Reece | 110/336 X |
| 2,890,009 | 6/1959 | Chapellier | 248/DIG. 1 |
| 2,904,299 | 9/1959 | Dalton | 248/293 |
| 3,070,527 | 12/1962 | Hurford et al. | 176/76 X |
| 3,130,773 | 4/1964 | Beattie et al. | 110/336 X |
| 3,203,376 | 8/1965 | Engelhardt | 110/336 X |
| 3,530,630 | 9/1970 | Smaga | 52/573 X |
| 3,606,979 | 9/1971 | Paine | 52/573 X |
| 3,801,454 | 4/1974 | Kumpf | 176/87 |
| 3,979,866 | 9/1976 | Prescott | 176/87 X |

FOREIGN PATENT DOCUMENTS 949020  2/1964  United Kingdom ......... 248/DIG. 1

Primary Examiner—J. Franklin Foss
Attorney, Agent, or Firm—Robert J. Edwards; Edward A. Steen; D. Anthony Gregory

[57] ABSTRACT

A rotatable and retractable storage lug (50), especially suited for, but not limited to, nuclear reactor applications is claimed. The lug (50) is equipped with a rotatable and slidable weight-cylinder assembly (76 and 64) in coaxial relationship with a pivoted support beam (60). Furthermore, the weight-cylinder assembly (76 and 64) and support beam (60) are connected together by a lockable channel (70 and 70A), groove (68 and 68A) and pin (62 and 62A) arrangement. By rotating the cylinder (64), the support beam (60) will assume either a horizontal or working position or a vertical or stored position.

14 Claims, 13 Drawing Figures

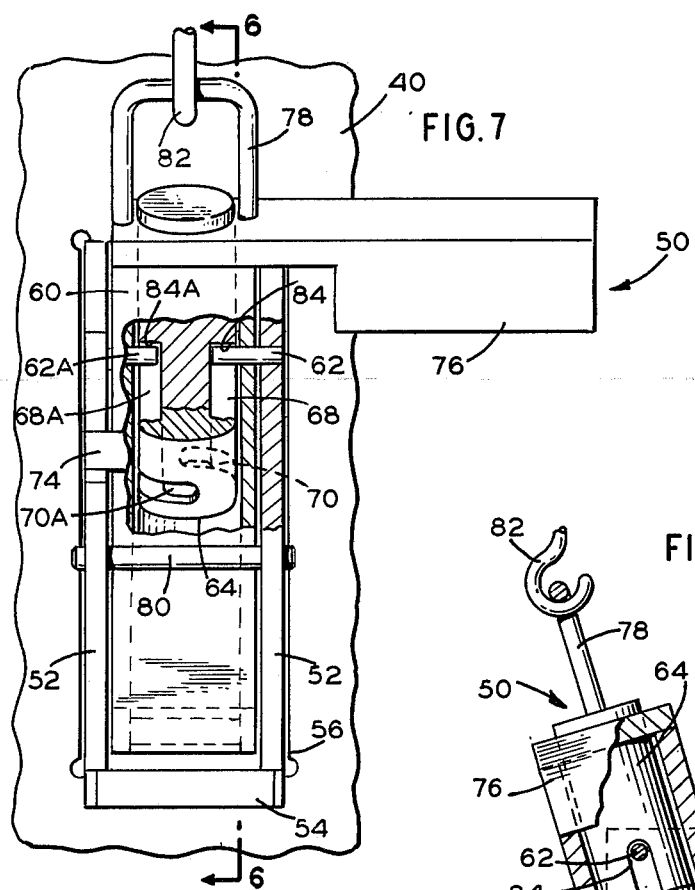
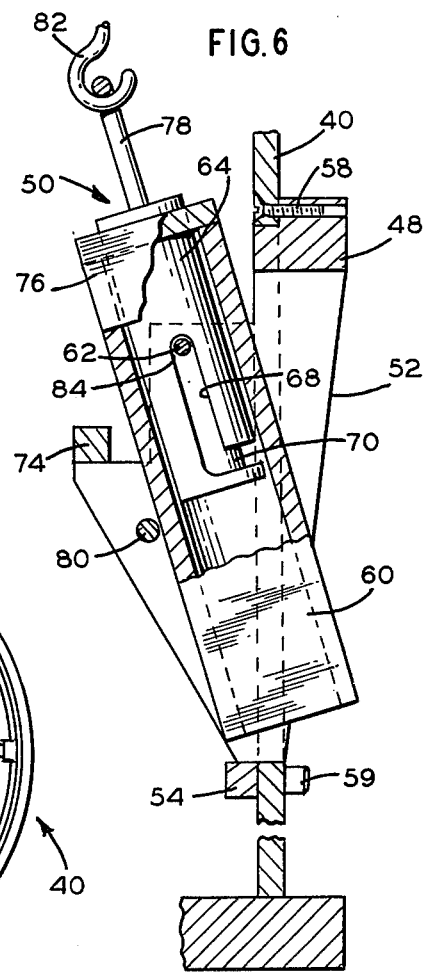
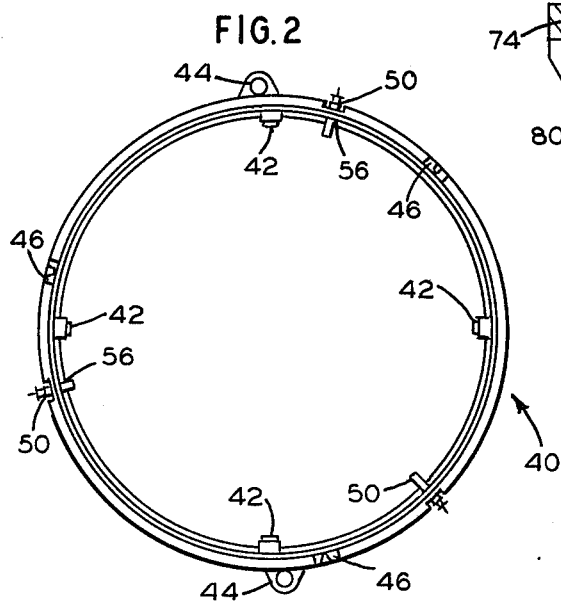

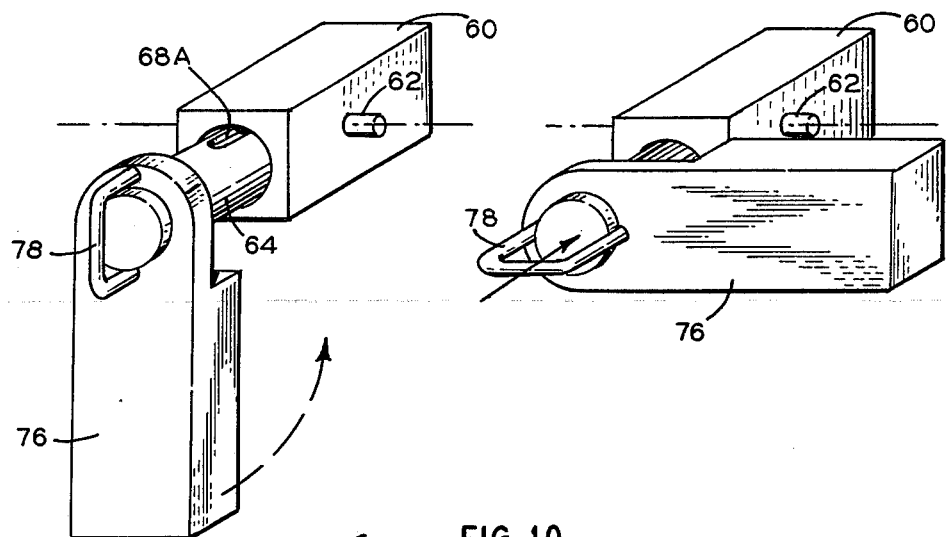

RETRACTABLE STORAGE LUG

TECHNICAL FIELD

This invention relates to supporting devices in general and more specifically to a retractable and rotatable support apparatus ideally suited for storing nuclear reactor components.

BACKGROUND ART

The involved practices of inspecting and refueling a nuclear reactor are both time consuming and complex. In addition to the ultimate goal of replenishing exhausted fuel assemblies, literally hundreds of ancillary tasks must be performed as well. The claimed invention relates to one of these tasks in particular.

In order to gain access to the reactor internals, various reactor components must be removed and stored until the requisite job is completed. In particular, current practice calls for an indexing fixture to be stored separately from a previously withdrawn plenum assembly. This step necessitates the utilization of large amounts of expensive floor space solely for storage purposes when, in fact, the floor space may be employed for more productive purposes or be eliminated entirely. In addition, protracted handling times are experienced in transporting the remotely stored indexing fixture to and from the reactor area. This state of affairs may be easily rectified by simply stacking the indexing fixture temporarily upon the removed plenum assembly. The plenum assembly is normally stored on a suitable internals storage stand adjacent to the reactor vessel during reactor maintenance and fuel replenishment periods.

Unfortunately, the support hardware presently available cannot be utilized in conjunction with the indexing fixture. Current designs call for manually moved and manually locked support devices which are ill-suited for remote operation. Furthermore, these designs are easily broken if inadvertently left in an improper position when a reverse load is applied. As a consequence, the indexing fixture cannot be stacked upon the plenum assembly but, instead, must be stored in some remote location.

Clearly, a more expeditious apparatus for supporting the indexing fixture is desirable.

SUMMARY OF THE INVENTION

The disclosed invention overcomes the aforementioned difficulties. By utilizing the instant invention, the indexing fixture may be stacked directly upon the plenum assembly thereby resulting in a savings in both floor storage space and downtime.

Briefly, the indexing fixture is equipped with a plurality of rotatable and retractable storage lugs. Each lug is equipped with a rotatable and slidable weight-cylinder assembly in coaxial relationship with a pivoted support beam. Moreover, the weight-cylinder assembly and the support beam are connected together by a lockable channel, groove and pin arrangement. By judiciously rotating the weight-cylinder assembly between a fixed 90° arc, the lug will lock in a selected position and automatically pivot into either a horizontal or vertical orientation solely due to the influence of gravity. Provision is allowed for the remote activation of the lug.

When the lug is placed in the horizontal or working position, the now self-supporting indexing fixture may be placed directly upon the withdrawn plenum assembly for expeditious storage. Conversely, when the lug is placed in the vertical or stored position, the interior of the fixture is free from all obstructions so that when the fixture is disposed within a nuclear reactor vessel, the various internal reactor components (including the plenum assembly) may be easily withdrawn and/or inserted directly through the indexing fixture.

BRIEF DESCRIPTION OF THE DRAWING

FIG. 2 is a plan view of an indexing fixture incorporating the invention.

FIG. 6 is a sectional side view of the invention in the stored position taken along line 6—6 of FIG. 7.

FIG. 7 is an end view of FIG. 6 partially broken away.

FIGS. 8, 9, 10 and 11 are perspective views of the invention in various positions.

BEST MODES FOR CARRYING OUT THE INVENTION

Figure 1A:
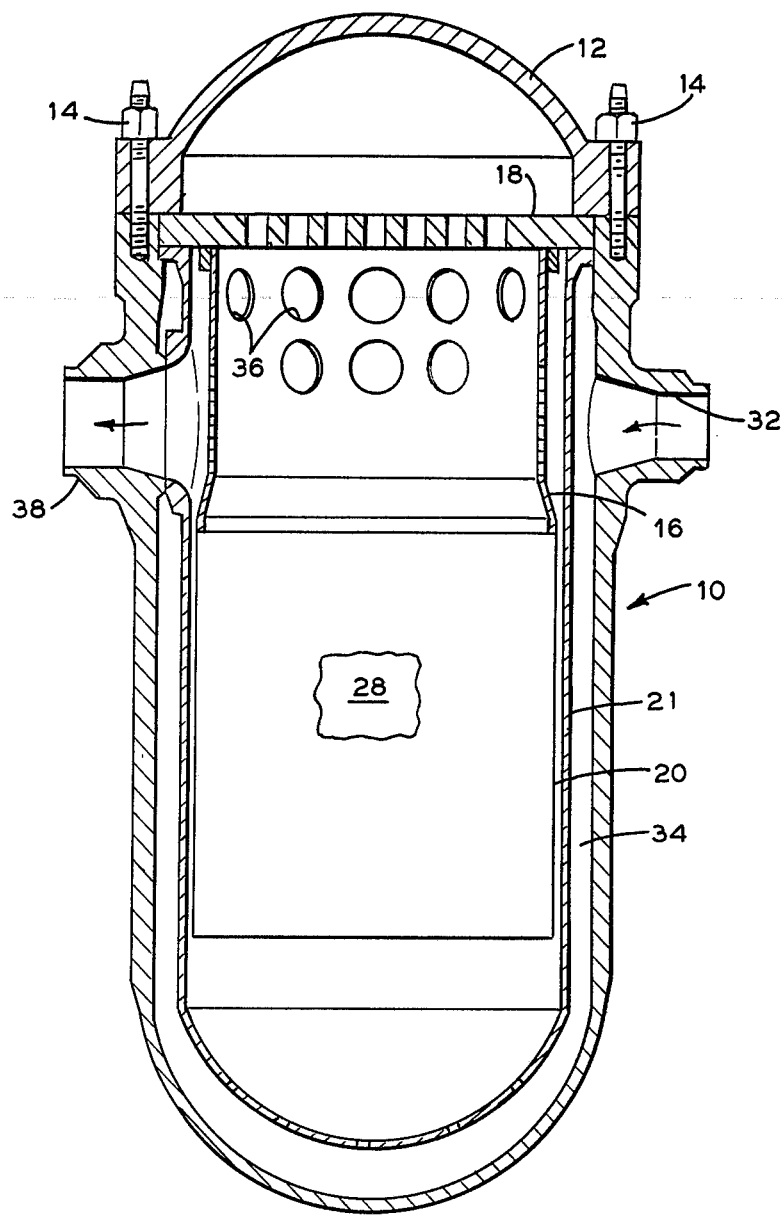
FIG. 1A is a cross sectional elevation of a nuclear reactor vessel.

FIG. 1A is a simplified depiction of the interior of a nuclear reactor pressure vessel 10. The vessel includes a closure head 12 which is detachably mounted to the vessel 10 by a plurality of threaded studs 14 (only two of which are shown). A plenum assembly 16 is oriented below the head 12. A perforated plenum assembly cover 18 is disposed upon the assembly 16.

The plenum assembly 16 is in registry with the core support assembly 20. The core support assembly, in turn, houses the core 28. A plurality of nuclear fuel assemblies (not shown) are disposed within the core 28.

Primary coolant enters inlet nozzle 32 wherein it flows downwardly through the annular space 34 formed between the core support cylinder 21 and the vessel 10. The coolant then flows upwardly through the core 28 wherein it is simultaneously heated as it passes in indirect heat exchange with the hot fuel assemblies. The heated coolant then flows through the perforations 36 in the plenum assembly 16 before exiting the vessel 10 via outlet nozzle 38.

During reactor refueling or internal inspection and maintenance periods, the closure head 12 is removed to expose the internals of the reactor. However, in order to physically gain access to the core 28, various reactor components must be removed from the vessel 10. For the purposes of this disclosure, it suffices to say that the pertinent components to be removed include the closure head 12, the plenum assembly 16, the plenum assembly cover 18 and, if necessary, the core support assembly 20.

Figure 1B:
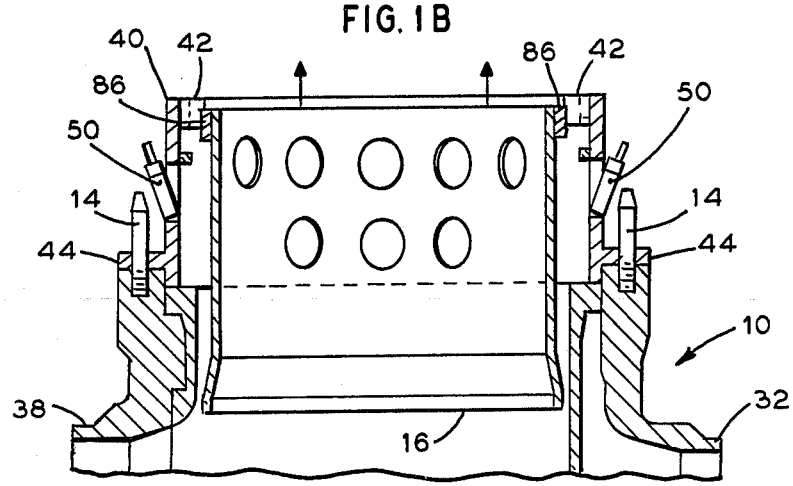
FIG. 1B is a partial cross sectional elevation of a nuclear reactor and an indexing fixture.

In order to remove (or install) the plenum assembly 16, the indexing fixture assembly 40 (FIG. 1B) is placed upon the vessel 10 after the closure head 12 and the plenum assembly cover 18 have been removed. Alignment lugs 44, attached to the indexing fixture assembly 40, are slipped over two of the studs 14 to stabilize the fixture 40 in place over the now open reactor 10. Alignment keys 42, in communication with the corresponding alignments slots 86 formed in the plenum assembly 16, act as guides to aid in the removal (or installation) of the assembly 16 so that none of the other internal reactor components are disturbed. A series of lifting sockets 46 aid in the placement and removal of the fixture 40 onto and from the vessel 10.

If desired, the core support assembly 20 may be removed (and installed) in the same manner as described above. That is, after the plenum assembly 16 has been removed, the core support assembly 20 is subsequently removed from the vessel 10 by lifting the assembly 20 through the fixture 40 through the offices of the alignment keys 42 and the corresponding alignment slots (not shown) formed within the core support assembly 20. In order to install the core support assembly 20, the aforementioned steps are followed in reverse order.

It should be appreciated that the operation and, indeed, the physical orientation of a nuclear reactor are much more complex than the brief description given above would indicate. However, for the purposes of the instant invention, a detailed description of other reactor processes and reactor components is unnecessary.

As was stated previously, the prior practice of storing the indexing fixture 40 away from the plenum assembly 16 was both time consuming and expensive. However, by equipping the indexing fixture 40 with a plurality of storage lugs 50, appreciable savings in both time and, more importantly, expensive floor space may be realized since the indexing fixture may be directly stored upon the plenum assembly.

Figure 1C:
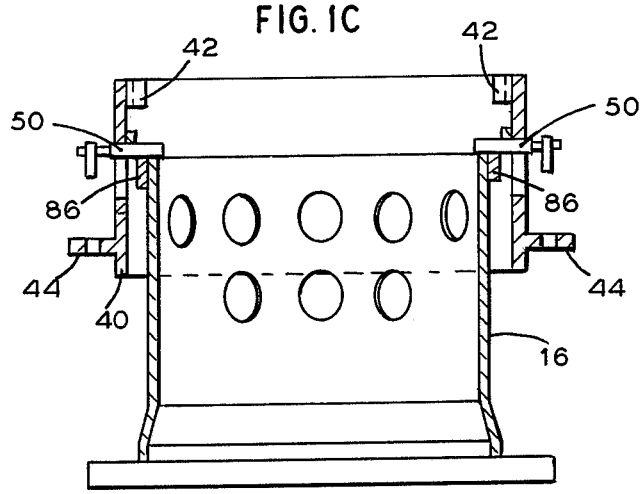
FIG. 1C is a cross sectional elevation of a plenum assembly and an indexing fixture.
Figure 3:
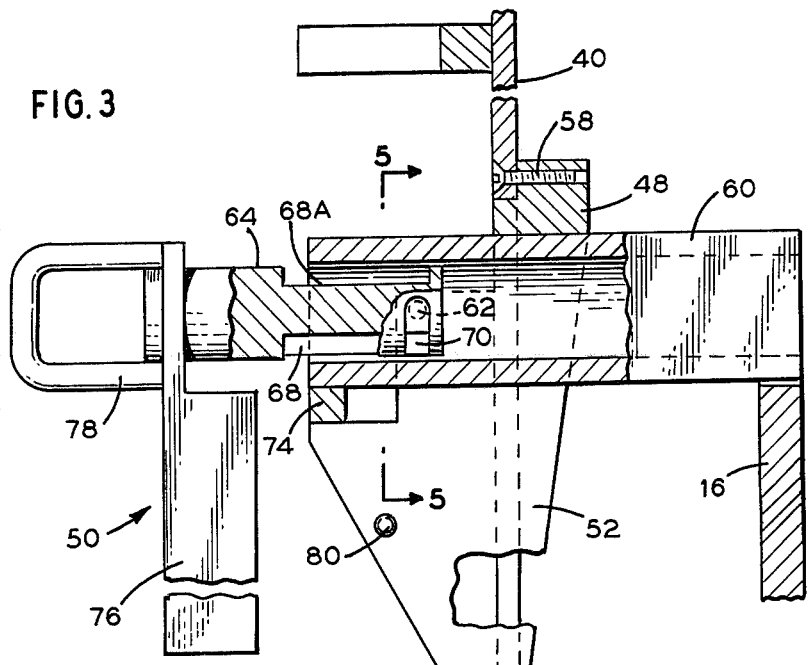
FIG. 3 is a sectional side view of the invention in the working position taken along line 3—3 of FIG. 5.
Figure 4:
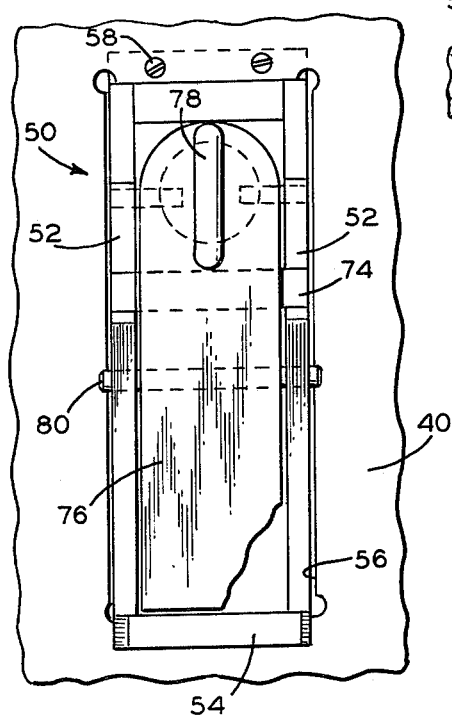
FIG. 4 is an end view of FIG. 3.

FIGS. 3 and 8 depict the lug 50 in the working position. In this orientation, the indexing fixture 40 may be easily stored upon the previously removed plenum assembly 16 in coaxial "piggyback" fashion. See FIG. 1C. The disclosed invention completely eliminates the need for additional floor storage space since the fixture 40 may be now easily stacked upon the plenum assembly 16. It should be understood that the indexing fixture and the plenum assembly are substantially equal in diameter; the indexing fixture having a slightly greater diameter to accommodate the through passage of the plenum assembly.

The lug 50 is comprised of a pair of parallel plates 52 and a pair of cross members 48 and 54. Note that the lug 50 is fitted into aperture 56 formed within the wall of the fixture 40. Fasteners 58 and 59 affix the lug 50 to the fixture 40.

Support beam 60 is suspended by and pivoted about a pair of opposed and independent coplanar pins 62 and 62A. See FIG. 5. In the preferred embodiment of the invention, the support beam 60 is in the form of a rectangular solid block having a circular cross-sectional passageway extending completely therethrough. Note further that the pins 62 and 62A do not support the beam 60 at its midpoint (the center of the beam) but rather at a predetermined distance away from the midpoint. The rationale for this construction will become readily apparent.

Coaxially disposed within the beam 60 is a slidable and a rotatable cylinder 64. The cylinder 64 includes two opposed and independent longitudinal grooves 68 and 68A. In addition, the cylinder includes two opposed and independent arcuate channels 70 and 70A. The channels 70 and 70A are disposed transversely to the centerline of the cylinder 64. It should be further noted that the grooves 68 and 68A are in partial perpendicular registry with the channels 70 and 70A, respectively. See FIG. 7. Numerals 84 and 84A denote the end sections of grooves 68 and 68A respectively. See FIGS. 6 and 7.

Surface 74 and cross member 48 support the beam 60 when it is in the working position. Furthermore, weight 76 and handle 78 are both affixed to the cylinder 64.

Figure 5:
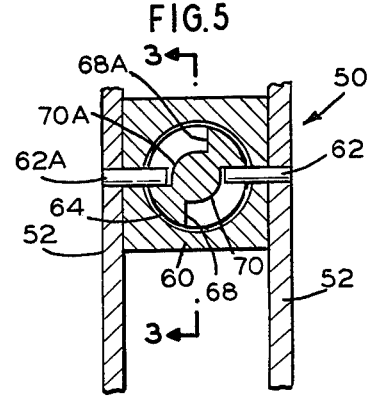
FIG. 5 is a view taken along line 5—5 of FIG. 3.

FIG. 5 depicts the relationship between the various internal components of the lug 50. Note than when the lug 50 is in the working position, the pins 62 and 62A nest within the channels 70 and 70A, respectively. As will be explained shortly, as the lug 50 is placed in the stored position, the cylinder 64 is rotated 90° in a counter-clockwise fashion so that the pins 62 and 62a will eventually be in registry with the longitudinal grooves 68 and 68A.

FIGS. 6 and 7 depict the lug 50 in the stored position. As was previously discussed, this position is employed when the indexing fixture has been installed on the reactor vessel 10. Note how the beam 60 does not create an obstruction along the inner circumference of the indexing fixture 40. This arrangement allows for the free vertical travel of any component located within the vessel 10. Stop pin 80 limits the amount of rotational movement experienced by the beam 60.

FIG. 7 discloses the various internal components of the lug 50 from another perspective. Note especially the relationship between the opposed and longitudinal grooves 68 and 68A, the two coplanar pins 62 and 62A, and the arcuate channels 70 and 70A.

The invention and the manner of applying it may, perhaps, be better understood by a brief discussion of the principles underlying the invention.

FIG. 8 and 11 depict the lug 50 in the working and stored positions, respectively. FIGS. 9 and 10 depict the lug 50 in two intermediate positions.

In order to appreciate the operation of the storage lug, assume that the lug is in the working position (FIGS. 3 and 8). Assume further that the indexing fixture 40 has already been lifted off the plenum assembly 16 (stored without the vessel 10) so that the beam 60 is no longer in communication with the plenum assembly.

The activation sequence is as follows: Firstly, the handle 78 is rotated by the hook 82 (not shown in FIG. 8) counter-clockwise through an arc of 90° so that the weight 76 assumes the horizontal orientation as depicted in FIG. 9. This step simultaneously rotates the cylinder 64 within the beam 60 as well. As was stated previously, as the cylinder 64 is rotated, the pins 62 and 62A will eventually be in registry with the grooves 68 and 68A respectively.

After the weight is in the 3 o'clock position (see FIG. 9), the weight is pushed inwardly. This step causes the cylinder, by virtue of the pin and groove arrangement, to "ride" the pins until the end sections 84 and 84A of the grooves 68 and 68A are in registry with the pins 62 and 62A respectively. See FIGS. 6, 7 and 10.

As a result of the aforementioned step, the center of gravity of the lug 50 will have dramatically shifted towards the free end of the beam 60 thereby allowing the beam to freely rotate about the pins into the stored position. Again, see FIGS. 6, 7 and 11.

To return the lug to the working position, the above steps are repeated in reverse order. That is, the operator pulls upwardly on the handle 78 with the hook 82. See FIG. 11. As the cylinder 62 is raised to its topmost position (the pins are now in registry with the channels), it is rotated 90° in a clockwise direction so that the pins are completely within the channels. The 90° turn simultaneously locks the cylinder in position and causes the center of gravity of the lug to shift towards the hooked end of the cylinder. Solely by the influence of gravity, the beam will fall into the working position. The indexing fixture is now ready to be stored above the previously removed plenum assembly 16.

The rate of rotation experienced by the lug 50 is a function, among other things, of the length of the grooves 68 and 68A. A longer set of grooves will undoubtedly allow the beam to shift its position more quickly than a relatively shorter set of grooves. This phenomenon occurs chiefly because the center of gravity of the lug is allowed to shift a greater distance. Consequently, the length of the grooves must be determined before final lug fabrication.

Furthermore, should the lug be exposed to a reverse loading condition, the beam will easily pivot out of harm's way until the load is removed. For example, if for some reason, a downwardly directed load is applied to the beam when it is in the working position, the beam will merely pivot in a clockwise direction into the stored position. When the load is removed, the beam will fall back to the working position. The opposite state of affairs will occur when the beam is originally in the stored position. In this manner, the problems of support device breakage presently bedeviling the industry have been greatly reduced.

It should be appreciated that the disclosed invention is not solely limited to nuclear applications. Rather, the storage lug may be employed in any situation that requires the utilization of a retractable supporting device.

Furthermore, the storage lug may be shaped, balanced and braced to support loads in any position and the positions need not be only horizontal, vertical or even 90° apart.

While in accordance with the provisions of the statutes there is illustrated and described herein specific embodiments of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. A support device for stacking and storing articles comprising a pair of parallel support plates, a pair of opposed independent coplanar pins extending inwardly from the plates, support means disposed between the plates and pivotally suspended by the pins, the pins partially extending through the support means, a cylindrical member slidably and coaxially disposed within the support means, the member slidably and rotatably engaging the pins, a weight attached to the member, means for rotating the member and means for affixing the device to the article to be stored.

2. The device according to claim 1 wherein the cylindrical member includes two opposed independent arcuate channels extending partially along the outer circumference of the member and transversely to the centerline of the member and two opposed independent longitudinal grooves partially extending along the length of the member.

3. The member according to claim 2 wherein one end of each groove is in perpendicular registry with a channel.

4. The device according to claim 1 including means for limiting the amount of movement experienced by the support means.

5. The device according to claim 1 wherein the pins support the support means at a predetermined distance away from the center of gravity of the support means so that as the member is repositioned, the center of gravity of the device will correspondingly shift thereby causing the support means to pivot about the pins as a result of the influence of gravity.

6. The device according to claim 1 wherein the means for rotating the member is in the shape of a closed ring.

7. The device according to claim 1 wherein the support means includes a square block with a circular cross-sectional passageway extending therethrough.

8. In combination with an indexing fixture including at least two apertures, a support device for storing the fixture above similarly sized articles, the device comprising a pair of parallel support plates, a pair of opposed independent coplanar pins extending inwardly from the plates, support means disposed between the plates and pivotally suspended by the pins, the pins partially extending through the support means, a cylindrical member slidably and coaxially disposed within the support means, the member slidably and rotatably engaging the pins, a weight attached to the member, and means for securing the device about each aperture.

9. The device according to claim 8 wherein the cylindrical member includes two opposed independent arcuate channels extending partially along the outer circumference of the member and transversely to the centeline of the member and two opposed independent longitudinal grooves partially extending along the length of the member.

10. The member according to claim 9 wherein one end of each groove is in perpendicular registry with a channel.

11. The device according to claim 8 including means for limiting the amount of movement experienced by the support means.

12. The device according to claim 8 wherein the pins support the support means at a predetermined distance away from the center of gravity of the support means so that as the member is repositioned, the center of gravity of the device will correspondingly shift thereby causing the support means to pivot about the pins as a result of the influence of gravity.

13. The device according to claim 8 wherein the means for rotating the member is in the shape of a closed ring.

14. The device according to claim 8 wherein the support means includes a square block with a circular cross-sectional passageway extending therethrough.

* * * * *